United States Patent [19]

Fortuna et al.

[11] Patent Number: 4,534,751
[45] Date of Patent: Aug. 13, 1985

[54] THERMOPLASTIC CONTAINER END AND METHOD AND APPARATUS FOR INERTIAL SPINWELDING OF THERMOPLASTIC CONTAINER ENDS

[75] Inventors: Vincent Fortuna, Huntington Beach, Calif.; Donald MacLaughlin, Midland, Mich.

[73] Assignee: Cosden Technology, Inc., Dallas, Tex.

[21] Appl. No.: 490,610

[22] Filed: May 2, 1983

Related U.S. Application Data

[60] Division of Ser. No. 405,642, Aug. 5, 1982, , which is a continuation-in-part of Ser. No. 234,344, Feb. 13, 1981, abandoned.

[51] Int. Cl.³ .................... B29C 27/08; B29C 19/00; B32B 31/00
[52] U.S. Cl. .................... 493/108; 493/390; 156/73.5; 156/294
[58] Field of Search .................... 156/69, 73.9, 73.5, 156/294, 293, 303.1, 308.4; 228/112, 2, DIG. 60; 229/5.5, 5.8, 5.6; 493/108, 390, 112, 388

[56] References Cited

U.S. PATENT DOCUMENTS

| | | |
|---|---|---|
| Re. 29,448 | 10/1977 | Brown et al. .................... 156/73.5 |
| 3,722,732 | 3/1973 | Edlund .................... 229/5.5 |
| 4,183,457 | 1/1980 | Loughley et al. .................... 229/5.5 |
| 4,247,346 | 1/1981 | Maehara et al. .................... 156/73.5 |
| 4,252,585 | 2/1981 | Raabe et al. .................... 229/5.5 |
| 4,353,761 | 10/1982 | Woerz et al. .................... 156/294 |

Primary Examiner—Edward Kimlin
Assistant Examiner—L. Falasco
Attorney, Agent, or Firm—Schwartz, Jeffery, Schwaab, Mack, Blumenthal & Evans

[57] ABSTRACT

A thermoplastic end (110), particularly a bottom, for a container which has upstanding paperboard sidewalls (112) and which is inertially spinwelded onto the paperboard sidewall for bonding. The end portion (110) has an annular groove (148) for snugly receiving the sidewall (112) and a wall configuration (136, 138, 140, 142 and 144) which minimizes the forces exerted on the bond which would tend to dislodge the end portion. The wall configuration is generally in the form of an inverted U-shape with a portion of an upstanding wall of the U forming a side of the annular groove. The end portion has strengthening ribs (122) positioned generally within the region of U-shape and additional radial ribs imparting strength and rigidity to the container end. The paperboard sidewall may be internally lined with a layer of thermoplastic material or may be unlined. During spinwelding, a sidewall supporting mandrel having an expansible engaging portion is inserted into the sidewall and subsequently expanded to define a cylindrical surface of a diameter equal to that of the specified internal diameter of the sidewall. A teflon seating member at the end of the sidewall supporting mandrel establishes the depth to which the container end is inserted into the sidewall.

3 Claims, 19 Drawing Figures

THERMOPLASTIC CONTAINER END AND METHOD AND APPARATUS FOR INERTIAL SPINWELDING OF THERMOPLASTIC CONTAINER ENDS

CROSS REFERENCE TO RELATED APPLICATIONS

This application is a divisional of a prior copending application, Ser. No. 405,642, filed Aug. 5, 1982 by Vincent E. Fortuna and Donald N. MacLaughlin for "Thermoplastic Container End and Method and Apparatus for Inertial Spinwelding of Thermoplastic Container Ends"; which prior copending application is a continuation-in-part of an original application (now abandoned) Ser. No. 234,344, filed Feb. 13, 1981, by Vincent E. Fortuna and Donald N. MacLaughlin, entitled "Inertial Spin Welding of Thermoplastic and Thermoplastic Coated Container Parts".

BACKGROUND OF THE INVENTION

1. Field of the Invention

The present invention relates to a new and useful improvement in container ends and more particularly to a thermoplastic end for a container having paperboard sidewalls. The invention further relates to a method of and apparatus for fabricating container components by inertial spinwelding.

2. Prior Art

Prior art paperboard sidewall containers, such as those used to package oil, orange juice, liquids and the like, or to package powders or other granular materials have typically utilized metal container ends attached to the paperboard sidewall by crimping or similar mechanical bonding. Such a container is expensive and complicated to construct, both in terms of the materials used and the fabrication methods utilized.

Plastic ends for such containers would be preferable but prior to this invention, no satisfactory method had been devised for attaching a plastic container end to a paperboard sidewall. Among the problems encountered are the relatively wide variations from nominal dimensions the paperboard sidewalls are produced in as well as the tendency for the plastic container ends to be dislodged from the container when a large force is applied to it in a direction normal to the plane of the container end, for example by dropping or shaking a full container. In addition, some plastic container ends exhibited a tendency to peel off or shear from the inside of the can wall.

As more fully discussed in copending Ser. No. 234,344 referenced above, U.S. Pat. No. Re. 29,448 discloses methods and apparatus for intertial spinwelding of thermoplastic container parts. As disclosed in that patent, two axially mating thermoplastic container sections are respectively mounted upon axially aligned mandrels. One of the mandrels is temporarily coupled to a rotary drive means to bring that mandrel and the container part carried by the mandrel up to a predetermined rotative speed, at which time the rotary drive is disengaged, the rotary inertia developed maintaining the mandrel in rotation after the drive is disengaged. The two mandrels are then moved toward each other and the two container parts carried by the respective mandrels seat with each other. The friction developed by the relatively rotating container section heats the plastic material as it simultaneously brakes the relative rotation to melt the material to fuse the sections to each other when the relative rotation ceases and the sections are permitted to cool.

In U.S. Pat. No. Re. 29,448, the two container sections being welded were both of a thermoplastic material. This fact is worthy of note in that in order to generate the frictional heat required to melt the plastic material, the mating sections of the container should preferably fit with each other with an interference fit. Where both sections are formed from the same thermoplastic material, the achievement of an interference fit of this type is not especially difficult in that the container section dimension is quite accurately established in the forming machine and any subsequent dimensional changes due to thermal expansion or contraction where the sections are stored for any substantial period of time prior to assembly normally affects both of the sections to substantially the same degree.

As alluded to above, in recent years, there has been substantial usage of containers in which the container body or side wall is formed primarily of paperboard or cardboard, usually sealed at the opposite ends by metal tops and bottoms. Cans for motor oil and frozen orange juice are typical examples of containers of this type. Where a paperboard container body is employed, it is often necessary to coat or line the interior of the paperboard body with some liquid tight material. Thermoplastic materials are frequently used for this purpose. Other containers, such as those used to hold powdered or solid materials, can be made using an uncoated paperboard body or sidewall.

Where the paperboard container body is lined with thermoplastic material, it has been proposed to employ a thermoplastic material for the container bottom which has led to the discovery that such bottoms could be spinwelded to the container body inasmuch as the container body has a layer of thermoplastic material on its interior surface. However, difficulties have been encountered in forming and maintaining the thermoplastic coated paperboard bodies within dimensional tolerances acceptable for such a spinwelding operation. In order to apply the thermoplastic liner to the paperboard, the thermoplastic is normally heated in order to bond it to the paperboard and subsequent cooling tends to shrink the material so that the container becomes undersized. Non-uniform shrinkage in storage also tends to occur, and the paperboard containers may, during preassembly handling and conveying operations, become slightly out of round.

Even in those instances where the paperboard sidewall is not coated with a thermoplastic fiber, many of the problems discussed above with regard to spinwelding are present. The primary concern, in either situation, is to insure that a bond of suitable integrity has been formed between the thermoplastic container end and the paperboard sidewall which will survive any expected forces which may be imposed on it.

A problem with all paperboard containers relates to the swelling of the paperboard with moisture content and the resultant problem of liquid "wicking up" through the paperboard with the attendant problem of leakage as well as the problem of loss of strength of the crimped metal-end container at the point of crimping where the liquid absorption is likely to occur.

Spinwelding plastic ends onto coated paperboard prevents wicking and leakage. On both coated and non-coated containers, a spinwelded container end is stronger than a crimped metal container end by a factor of two-to-one or higher.

SUMMARY OF THE INVENTION

It is therefore an object of the present invention to provide a plastic end suitable for use with a paperboard container sidewall.

It is a further object of the present invention to provide a container having a paperboard sidewall with a plastic end spinwelded onto the sidewall.

It is a still further object of the present invention to provide a container, suitable for holding liquids such as oil, or powders such as punch mix, which is strong, made of inexpensive materials and easy to fabricate.

It is a further object of the present invention to provide an improved method and apparatus for attaching a thermoplastic container end onto a paperboard sidewall, both where the sidewall is coated with a thermoplastic film and where the sidewall is uncoated paperboard, to produce a container.

To achieve the foregoing and other objects and in accordance with the purpose of the present invention, the preferred embodiment of this invention may comprise a container comprising a plastic end member adapted to be attached to a paperboard sidewall by spinwelding. The plastic end member will preferably have a divergent lip portion which forms an annular groove into which the paperboard sidwall will snugly fit for forming a spinwelded bond.

In order to minimize the forces on the bond, the end portion preferably has an upstanding wall portion adjacent to the lip which has a beveled portion and which bends into a ridge parallel to the plane of the end member and then smoothly bends along serpentine arcs to approximately the level of the bottom of the container. Most of the forces acting on the end portion will, therefore, be directed radially with respect to the axis of the container end as opposed to normally, thereby reducing the forces acting to dislodge the end of the container in the event a full container is shaken or dropped. In addition, the container end will preferably include a plurality of rib members, arranged around the inner rim of the lip portion and positioned as radial fins to provide strength and rigidity to the end member, as well as to function as a force transmitting member and to provide a spindle hold during fabrication.

It is also preferred to provide the end member with additional strength and rigidity imparting topographical features.

It is also preferred to provide an upstanding annular flange member opposite the lip portion which can act as a "base" or support for the container and also provide a convenient and secure stacking key. The container of the present invention may be produced by spinwelding technique to form the end portions and sidewall together.

In accordance with the fabrication aspects of the present invention, a mandrel for supporting either a thermoplastic line or unlined paperboard cylindrical container sidewall during a spinwelding operation is provided with an expansible container body engaging assembly which, in a contracted position, can be axially inserted into the container body. Container sidewall engaging members in the form of circumferential segments of a cylindrical surface are normally maintained in a contracted position, as by a circumferential garter spring. Inclined internal cam surfaces on each of the segmental members are slidably engaged by a complementarily inclined actuating cam which, upon axial movement relative to the segmental members, radially expands them outwardly to an expanded position. In this expanded position, the outer cylindrical surfaces of the segmental members are accurately located to define a cylindrical surface of a diameter precisely equal to the specified internal diameter of the sidewall for spinwelding purposes.

As alluded to above, a container bottom or end of thermoplastic material is formed with an axially upwardly projecting portion upstanding from the lip portion, the major outer surface of which is dimensioned for the desired interference fit with the specified internal diameter of the container sidewall. The outer upper edge of this upwardly projecting portion should preferably be tapered upwardly and inwardly so that the container end can be pressed up into the interior of the container sidewall with the desired press fit.

A seating member is mounted at the lower end of the sidewall carrying mandrel to establish the depth to which the container end is inserted into the container sidewall. The seating member may preferably comprise a solid, non-rotating teflon head.

During assembly, the container end is first elevated by its mandrel into contact with the head, and the container end carrying mandrel is then engaged with the rotary drive to bring the mandrel up to rotary speed.

Additional objects, advantages and novel features of the invention will be set forth in part in the description which follows, and in part will become apparent to those skilled in the art upon examination of the following or may be learned by practice of the invention. The object and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the preferred embodiment of the present invention and, together with the description, serve to explain the principles of the invention. In the drawings:

FIGS. 13-1 through 13-7 are schematic diagrams showing sequential steps in the spinwelding operation performed by the machine.

DETAILED DESCRIPTION OF THE INVENTION

Figure 1:
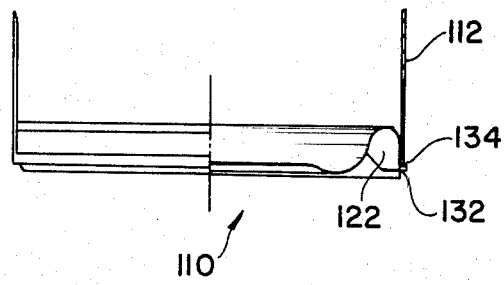
FIG. 1 is a side elevation, in partial section, of a container end in accordance with the present invention.

Turning first to FIG. 1, there is depicted a side elevation of a container end, generally 110, in accordance with the present invention which is spinwelded onto, for instance, a paperboard cylinder 112 to form a container. The details of the container end will be discussed below with regard to FIG. 3.

Figure 2:
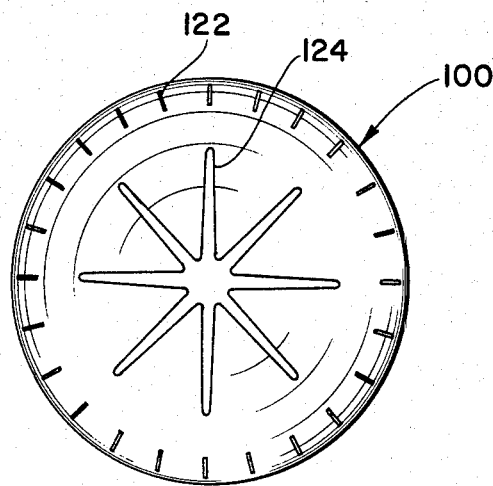
FIG. 2 is a top view of the container end of FIG. 1 from the view A—A.

In FIG. 2, there is depicted a bottom of the container end of the present invention. The fin or rib members 122 adjoining the lip portion 150 of the container end as well as the star-shaped strengthening ribs 124 which preferably radiate from the center of the container end can be easily seen in FIG. 2.

Figure 3:
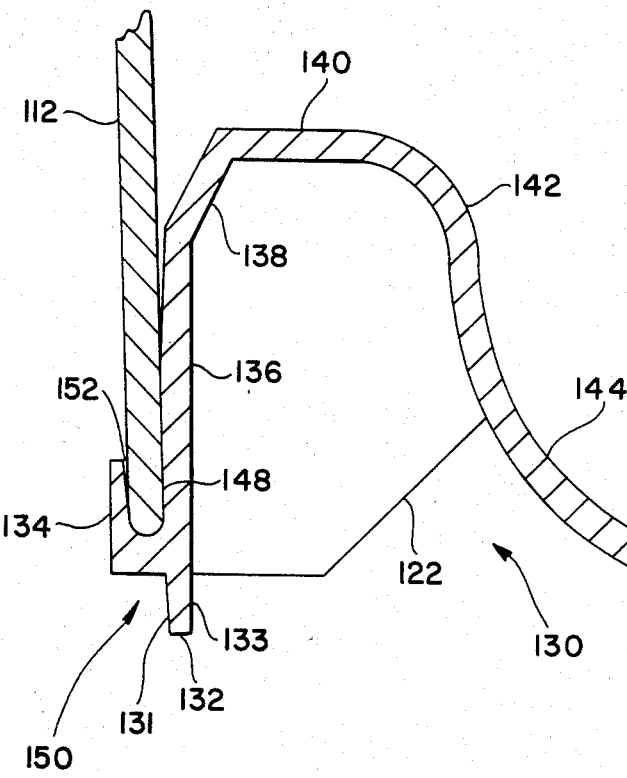
FIG. 3 is a fragmentary, enlarged view in section of a lip and curved portion of the container end of FIG. 1 showing the flange members and the support and/or stacking structure.

Turning now to FIG. 3, there is depicted a detail of the container end 110 in accordance with the present invention. The container end is made of a spinweldable plastic, such as Dupont 7920 HDPE or equivalent, and has a lip portion, generally 150, for receiving a cardboard container sidewall 112, which usually is in the shape of a right circular cylinder. The inside of the container sidewall may be coated with a film of thermoplastic material although, as explained above, such a film is not always necessary. An annular groove 148 onto which the sidewall fits has a divergent opening formed by wall member 136 and flange wall 134. Preferably, the walls will each diverge from the vertical by an angle of about on the order of 2°. The annular groove will, therefore, easily accommodate paperboard cylinders whose actual dimensions may be at variance with nominal specifications. The inner lip 152 of the flange member 134 should preferably have a rounded corner so as to further aid in urging the sidewall 112 into the groove 148.

Opposite the generally vertical wall 136 there is circular ridge or flange 132 which serves several functions. It functions as a base or stand for the container as well as a stacking guide. The ridge 132 has slightly tapered sidewalls 131 and 133, each which taper about on the order of 2° from the vertical. This ridge will rest against the transition bevel portion 138 of an adjacent stacked container end during shipment, and additionally provide a steady base for storing, stacking or otherwise handling the finished container. Additionally, however, the ridge 132 is designed to transfer pressure on the can end (bottom) to the sidewall 112 and to thereby prevent "peel-off" or shear of the can bottom from the sidewall.

The generally upstanding portion 136 of the container end, together with the cardboard cylinder and the flange member 134, form the sealing means for the container. It should be noted that the sealing, preferably by spinwelding, occurs along surfaces that are generally normal to the forces expected to exist in the container when it has been filled. It will be appreciated by the artisan that, while spinweld bonding is a fast, efficient and inexpensive operation, the resultant seal has only limited strength in the direction normal to the bond and much greater strength in the direction parallel to the bond. Therefore, a container end whose bonding surfaces are normal to the direction of the forces exerted by the fluid in the container will have a tendency to break loose from the sidewall, thus spilling the contents of the container, especially in the event the full container is shaken or dropped.

As will be appreciated by the artisan, the fluid in the container will exert forces generally normal to the container surfaces. These forces are particularly great when the container is used to hold a fluid and the fluid shifts, abruptly exerting forces on the various container walls. In the present container end design, it should be appreciated that the forces on the container sidewall end bond are reduced by the structure which directs those forces to the areas of greatest strength, i.e., normal to the sidewall. For instance, should a full container of the present design be dropped, no significant fluid force is exerted againt wall 136 of the container end. The forces exerted on the upper portion 140 of the can and the beveled portion 138 are directed by wall 136 and rib 122 to act either as forces in compression of the spinweld bond or parallel to it. Likewise, fluid forces exerted on curved portions 142 and 144 act generally in compression of the spinweld bond or parallel to it, i.e., generally vertically. Other forces extended along the direction of the sidewall are transferred by the base member (ridge 132) to be exerted on the sidewall 112.

During assembly, the beveled or tapered portion 138 of the container end acts as a "lead in" or taper to position the container sidewall and direct it into the groove portion 148. Rib members 122 and 124 act to provide strength, rigidity to the container end structure. Rib member 122 functions as well as to redirect fluid imposed forces acting on the weld bond.

The resulting structure is a container end which may be securely bonded to the sidewall in such a manner as to redirect those forces which would tend to loosen the container end. In addition, the structure is strong and rigid and is stackable and sturdy.

The machine of the present invention, taken as a whole, utilizes many of the features disclosed in U.S. Pat. No. Re. 29,448, the disclosure of which is hereby incorporated by reference. In the following description, and in the drawings, many parts of the present machine are illustrated in a simplified form and described only generally inasmuch as similar parts and structures are shown and described in detail in U.S. Pat. No. Re. 29,448 and copending application Ser. No. 234,344, to which reference may be had if further detail is desired.

Figure 4:
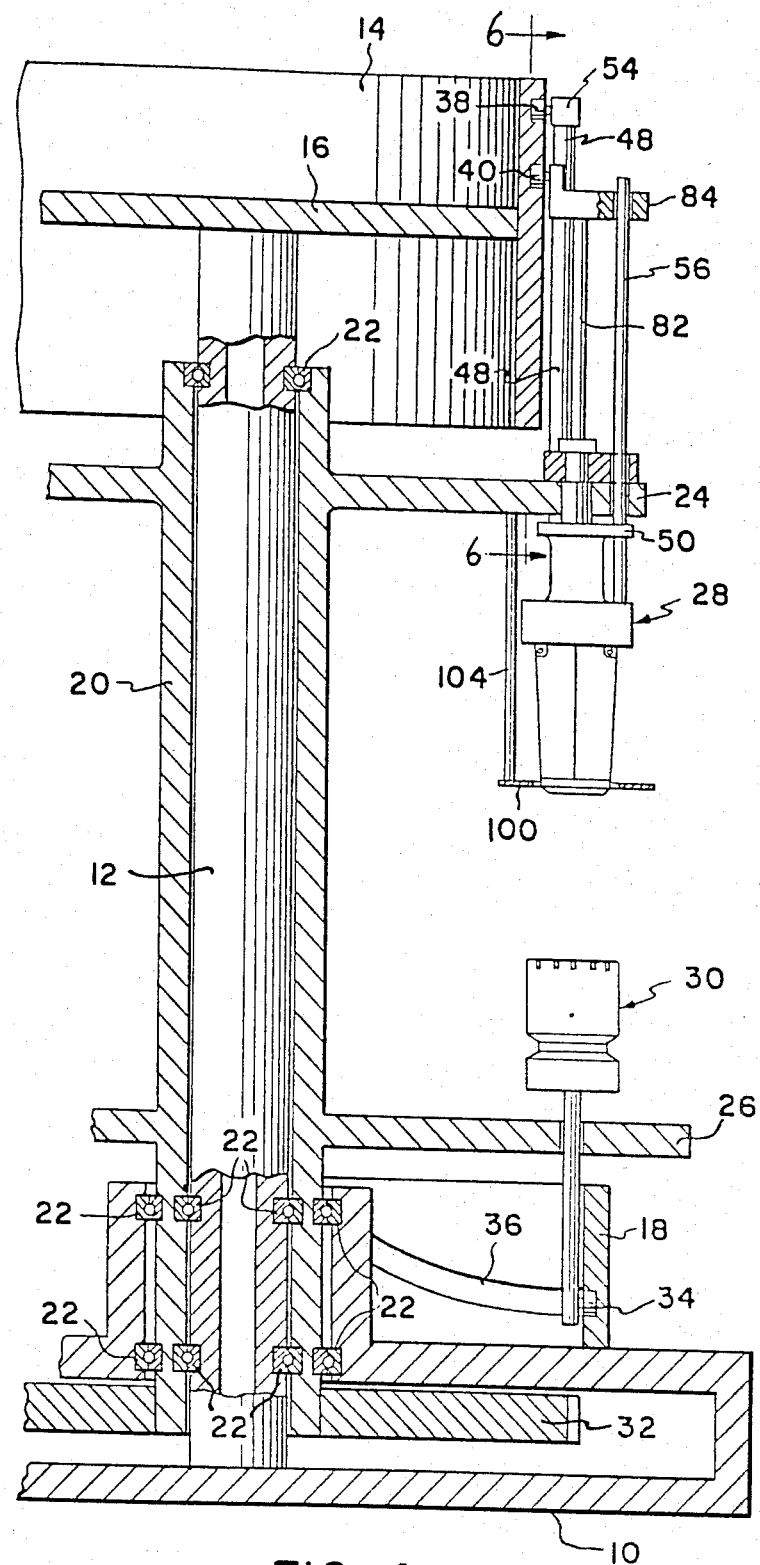
FIG. 4 is a cross-sectional view, with certain parts omitted or broken away, of an inertial spinwelding machine embodying the present invention.

Referring to FIG. 4, the stationary frame of the present machine includes a base designated generally 10 which fixedly supports a vertically extending central post 12. A cylindrical cam track 14 is fixedly mounted as by a plate 16 upon the upper end of post 12 in coaxial relationship with the vertical axis of the post. A second cylindrical cam track 18 is fixedly mounted on base 10. All of the structure described thus far constitutes the stationary frame of the machine, all of the remaining shown in FIG. 1 is mounted for rotation about the axis of vertical post 12, only a portion of the rotatable structure being shown.

The rotary structure includes a central sleeve 20 mounted upon post 12 for rotation relative to the post as by a series of bearings 22, sleeve 20 carrying upper and lower tables 24, 26 fixedly attached to the sleeve.

In FIG. 4 there is shown only a single set of mandrels which include an upper mandrel assembly designated generally 28, supported generally from upper table 24, and a lower mandrel assembly designated generally 30 carried generally by lower table 26. In the actual machine, there are several sets of upper and lower mandrels disposed symmetrically about the axis of the machine, this arrangement being shown in U.S. Pat. No. Re. 29,448 previously referred to.

A drive gear 32 is fixedly secured to the lower end of sleeve 20 to drive the sleeve and the various parts mounted thereon in rotation about post 12. As the sleeve and upper and lower tables 24 and 26 are rotated, the upper and lower mandrels 28 and 30 move in a circular path around central post 12. During this movement, a roller 34 on lower mandrel assembly 30 moves along a groove 36 in lower cam track 18 to raise and lower, lower mandrel assembly 30 at appropriate points in its cyclic movement around post 12. A similar roller 38 engaged in a similar groove in upper cam track 14 likewise vertically raises and lowers upper mandrel assembly 28, while a second roller 40 engaged with upper cam track 14 operates an actuating device to be described below. The vertical reciprocation of the mandrel assemblies is quite similar to that described in detail in U.S. Pat. No. Re. 29,448, for which reference may be had for further details.

Further details of upper mandrel assembly 28 are shown in FIGS. 5–8.

Figure 5:
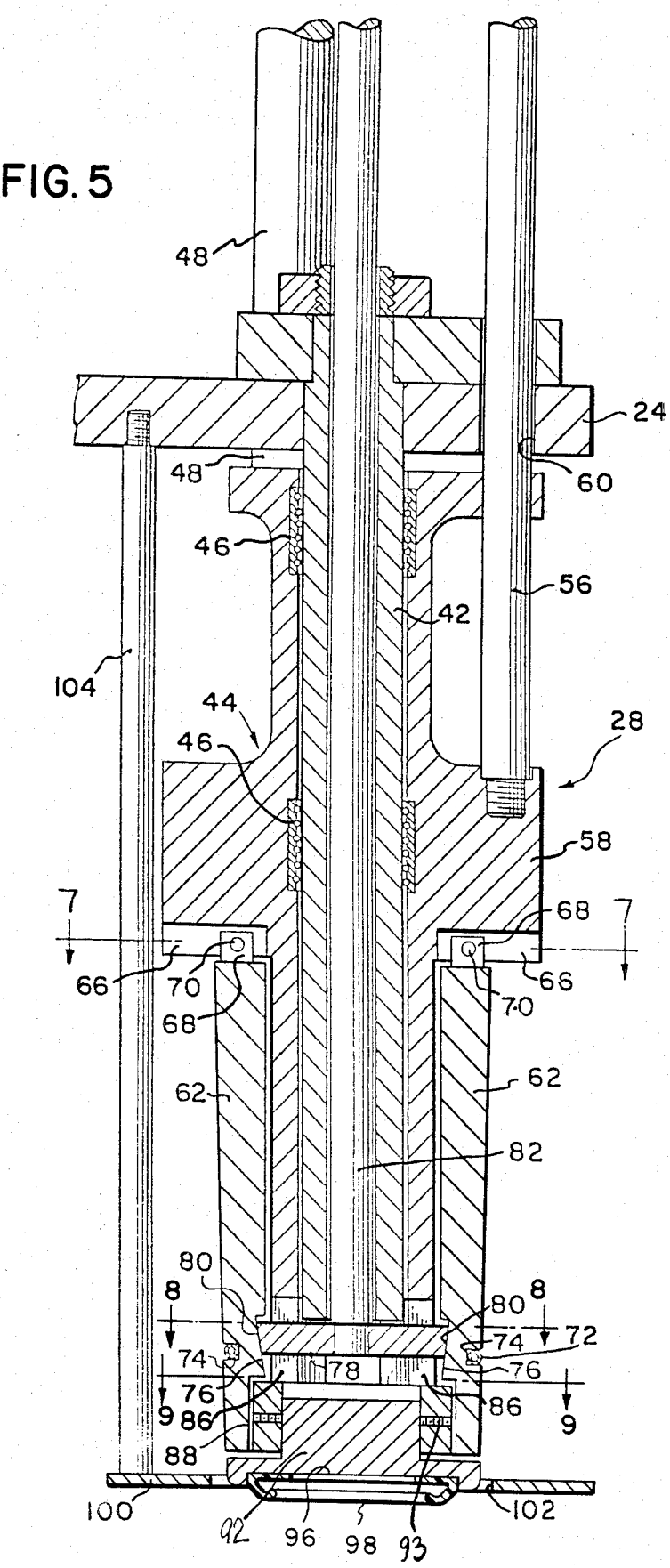
FIG. 5 is a detail cross-sectional view of an upper mandrel of the machine in FIG. 4.

Referring first to FIG. 5, upper mandrel assembly 28 includes a rigid hollow sleeve 42 which is fixedly secured at its upper end to upper table 24. A housing designated generally 44 is mounted on the exterior of sleeve 42, as by slide bearings 46 for vertical reciprocatory movement on sleeve 42. Housing 44 is suspended by a pair of support rods 48, see FIG. 6, which are fixedly secured at their lower ends to flange 50 of housing 44 and pass upwardly through openings 52 in upper table 24. A cross member 54 is fixedly secured to the upper ends of support rods 48 and serves as a mounting for cam roller 38 which, as best seen in FIG. 4, rides in the upper groove of cam track 14. Housing 44 is thus suspended by support rods 48 from cam roller 38 and the housing moves upwardly and downwardly in accordance with the path followed by roller 38.

Returning now to FIG. 5, a vertical guide rod 56 is fixedly secured at its lower end to a second flange 58 on housing 44 and projects upwardly through an opening 60 in upper table 24 to vertically guide housing 44 in movement.

Figure 7:
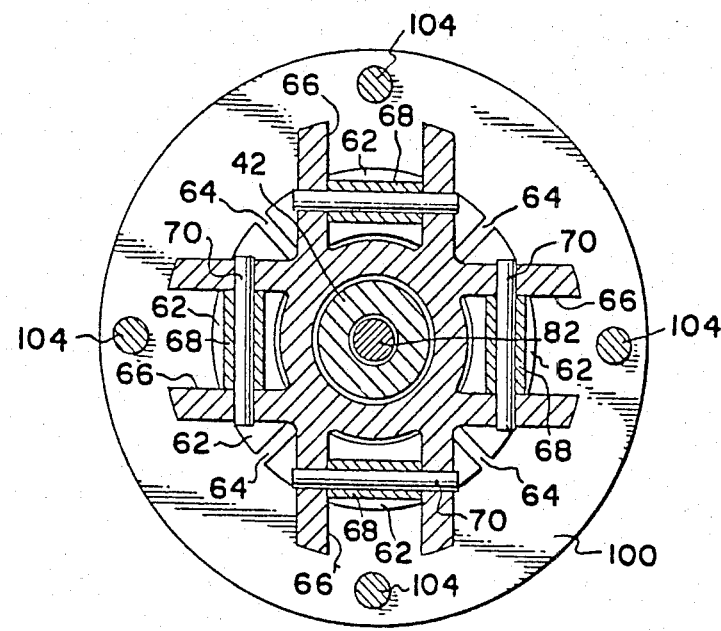
FIG. 7 is a detail cross-sectional view taken on the line 7—7 of FIG. 5.
Figure 8:
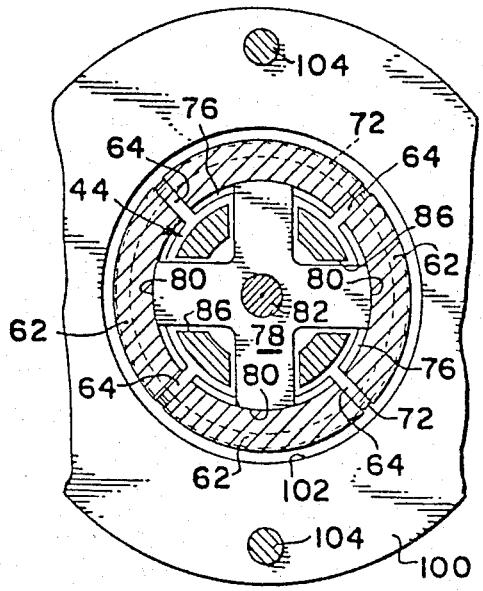
FIG. 8 is a detail cross-sectional view taken on the line 8—8 of FIG. 5.
Figure 9:
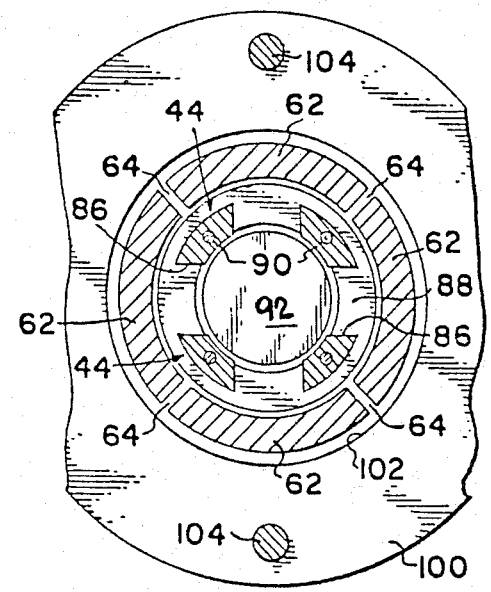
FIG. 9 is a detail cross-sectional view taken on the line 9—9 of FIG. 5.

Four container body engaging members 62 are pivotally suspended from the lower side of flange 58. As best seen in FIGS. 7–9, the four engaging members 62 have the conformation of a circumferential segment of a hollow cylinder, the circumferential extent of each body engaging segment 62 being slightly less than one-quarter of the overall circumference so that spaces such as 64 between the axially extending edges of adjacent members 62 enable the members to be moved radially inwardly relative to one another to an outer diameter less than that of their outer surfaces. The outer diameter of the members 62 as viewed in FIGS. 7, 8 and 9 is equal (with a slight negative tolerance) to the specified internal diameter of a cylindrical container body to be received upon the members 62. This particular diameter is of substantial importance to the present invention and will be discussed in further detail below.

Figure 6:
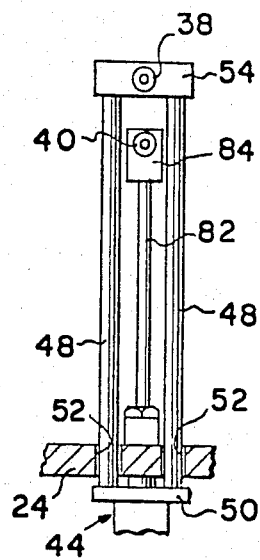
FIG. 6 is a detail cross-sectional view taken on the line 6—6 of FIG. 4.

Referring now particularly to FIGS. 5 and 6, it is seen that four radial slots 66 are cut into the underside of housing flange 58, each slot, as best seen in FIG. 7, overlying one of the body engaging members 62. A projection 68 at the upper end of each member 62 passes upwardly through the slot 66 and a horizontally extending pivot pin 70 pivotally suspends each member 62 from housing 44 at the underside of flange 58. Pivot pins 70 all lie in a common horizontal plane and, as best seen from FIG. 4, are so oriented that they are all tangent to a common circle centered on the central vertical axis of sleeve 42. A garter spring 72 is mounted within circumferential grooves 74 on the outer sides of each of the members 62 and resiliently biases the lower ends of the four members 62 radially inwardly toward each other so that the outer surfaces of member 62, as viewed in FIG. 5, are normally inclined downwardly and inwardly toward each other.

Referring now particular to FIG. 5, a downwardly and inwardly inclined cam surface 76 is formed on the interior side of each member 62 near the lower end of the member. A cam member 78 having cam surfaces 80 of complementary inclination is located between the member 62 and is fixedly mounted to the lower end of an actuating rod 82 which passes freely centrally upwardly through sleeve 42 and is secured at its upper end (FIG. 8) to a bracket 84 which mounts cam roller 40. As best seen in FIG. 4, bracket 84 also slidably receives the upper end of guide rod 56.

Referring now particularly to FIG. 8, it is seen that cam member 78 is of a cross-shaped configuration when viewed from above, with cam surfaces 80 being located at the ends of each of the four arms of the cross-shaped configuration. The lower portion of housing 44 is provided with four radial slots 86 through which the arm portions of cam member 78 freely project.

It will be understood by the artisan that other embodiments of an expanding tool described above, such as a slotted spring steel collet sleeve similar to the type commonly used in a drill chuck can be used with the present invention. Such a sleeve should have a tapered bore with a wedge member inside the bore to spread the collet fingers.

Referring now particularly to FIGS. 5 and 9, an annular retainer 88 is fixedly mounted to the lower end of housing 44 as by screws 90 (FIG. 9). Retainer 88 supports a solid teflon-lined head 92 by use of screws, or the like 93. The head 92 does not rotate and is aligned with the central axis of housing 44 at the lower end of the housing.

Alternatively, a freely rotating seating member such as that described in U.S. Pat. No. Re. 24,448 can be used.

An ejector plate 100 having a circular opening 102 is mounted at the lower end of a plurality of support rods such as 104, support rods 104 being fixedly mounted in table 124.

Figure 10:
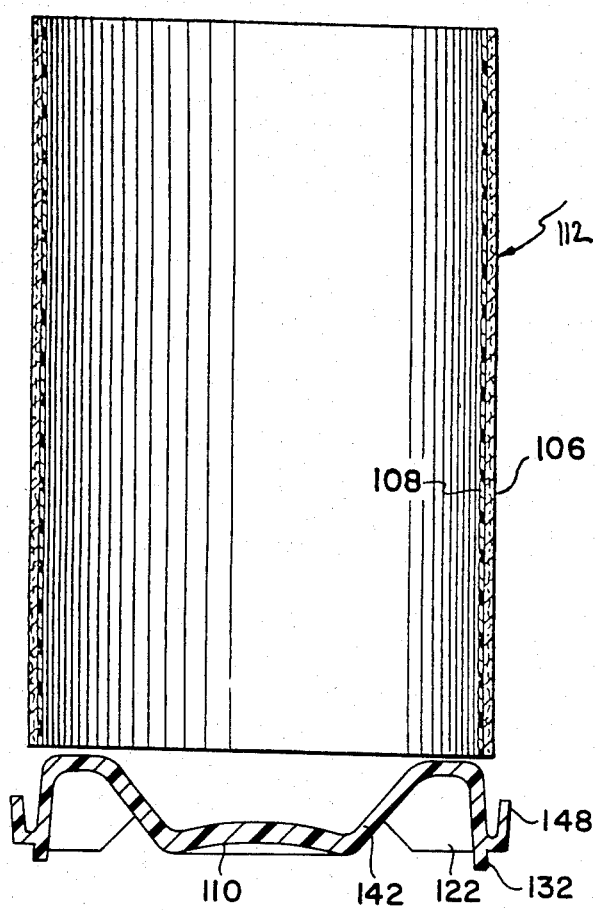
FIG. 10 is a cross-sectional view of a container body and container bottom to be spinwelded by the machine of FIG. 4.
Figure 11:
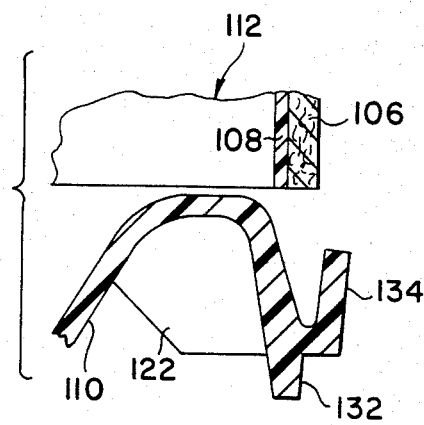
FIG. 11 is an enlarged detail cross-sectional view of the container bottom and body indicating relative dimensions.
Figure 12:
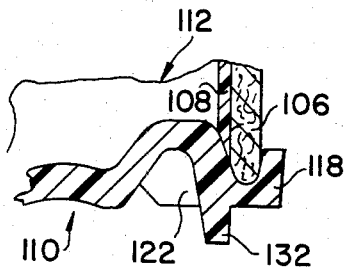
FIG. 12 is a detail cross-sectional view showing the container bottom and body welded to each other.

Referring now to FIGS. 10–12, in those figures are shown cross-sectional views of a container sidewall and end which are to be spinwelded by the apparatus described above. Referring first to FIG. 10, a container body 112 of cylindrical shape is shown in cross section. The container sidewall 112 is formed of a cylindrical tube of paperboard 106 whose interior surface may be lined with a moisture barrier liner or coat of a suitable thermoplastic material 108 such as polyethylene, polystyrene, or polypropylene. A container end 110 as described hereinabove is formed of a thermoplastic synthetic plastic material in the manner described in connection with FIGS. 1–3 above. As best seen in the enlarged view of FIG. 11, wall portion 136 is formed with a downwardly and outwardly inclined surface at its upper end, because in order to perform the desired spinwelding operation, there must be an interference fit between the inner surface on container body 112 and the outer surface of wall portion 136. The inclinded surface 138 enables the wall portion 136 to be pushed axially inwardly into the container interior with a shoehorn-like action.

A second upwardly projecting flange 134, located upon the container end 110, serves to protect the lower edge of the paperboard portion of the container body, as best illustrated in FIG. 12, which shows an end and container sidewall at the conclusion of the spinwelding operation.

As noted above, the container bottom 110 preferably is provided with a downwardly projecting flange 132 and a plurality of radially extending ribs 122 extend from the inner side fo flange 132 to the bottom surface 144 of end 110 to provide a rotary drive coupling between the bottom 110 and lugs formed on the upper surface of lower mandrel 30.

A general sequence of operation of the apparatus described above is illustrated schematically in FIGS. 13-1 through 13-7.

Figures 1, 2, 3, 4, 5, 6, 7, 13:
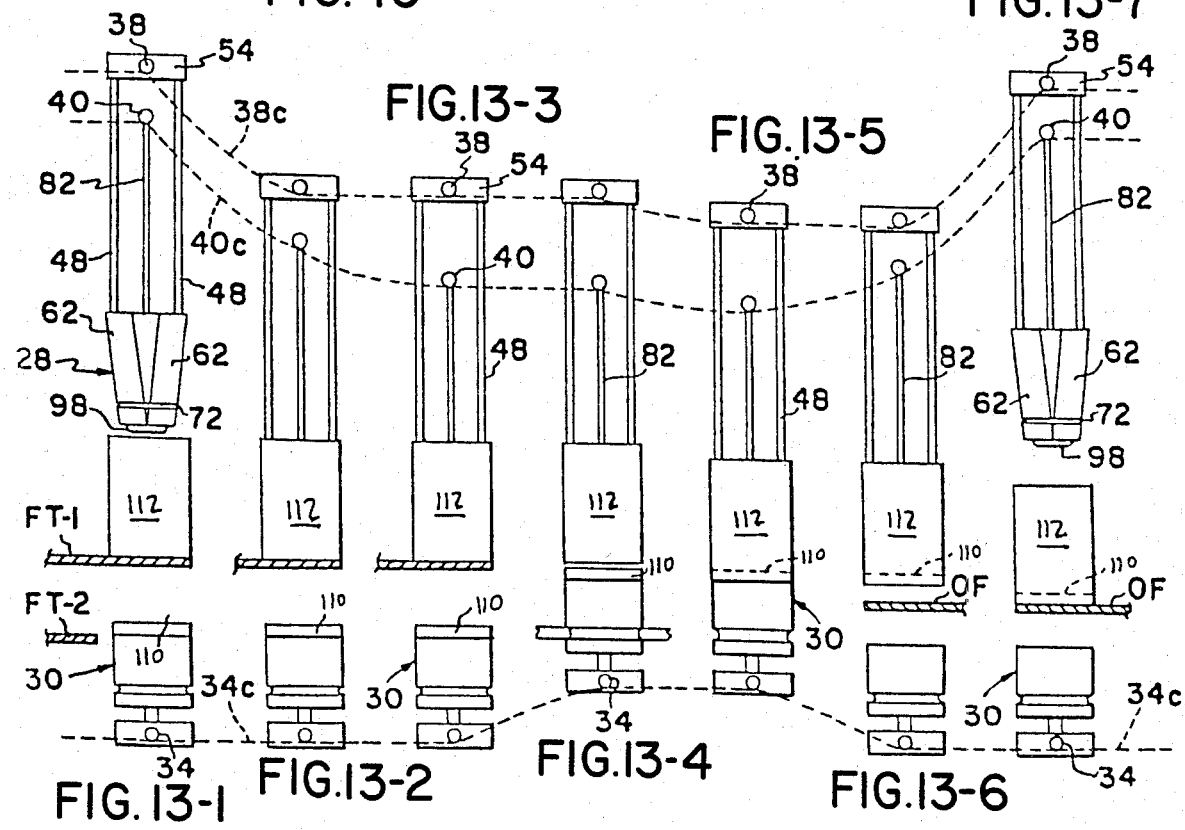

The initial step in the operation is shown in FIG. 13-1 in which upper mandrel 28 is raised to its maximum elevation and cam actuating rod 82 is likewise raised to its maximum elevation to position cam member 78 relative to body engaging members 62 in the position shown in FIG. 5. As previously described, vertical positioning of upper mandrel 28 and cam actuator 82 is controlled by rollers 38 and 40 respectively, these rollers riding in grooves in the stationary upper cam track 14 (FIG. 4) to raise and lower the respective rollers at the upper and lower mandrels are rotated about the axis of central post 12 of the machine frame. The broken lines 38C and 40C in FIGS. 13-1 through 13-7 approximately indicate the configuration of the cam tracks upon which rollers 38 and 40 ride. Similarly, the broken line 34C indicates the cam track upon which the lower mandrel positioning roller 34 moves.

With cam rod 82 and cam 78 in their maximum elevated position relative to body engaging segments 62, garter spring 72 has radially contracted the lower ends of segments 62 so that the cylindrical outer surfaces of segments 62 in FIG. 13-1 approximate a downwardly convergent frustoconical surface having an outside diameter at its lower end substantially less than the internal diameter of a container sidewall 112.

In FIG. 13-1, a container body 112 is located on a feed table FT-1 in underlying coaxial alignment with upper mandrel 28. A container end 110 has been fed from a second feed table FT-2 onto the upper end of lower mandrel 30.

In FIG. 13-2, upper mandrel 28 has been lowered to insert the container sidewall engaging segments 62, fully into the interior of the container sidewall 112. During this lowering movement of upper mandrel 28, cam actuating rod 82 is simultaneously lowered so that no relative vertical movement between actuating rod 82 and upper mandrel 28 occurs, and the body engaging segments 62, located in the interior of container sidewall 112 in FIG. 13-2 are thus still in the radially contracted position as in FIG. 13-1.

In FIG. 13-3, actuating rod 82 has been moved downwardly relative to upper mandrel 28. Referring briefly to FIG. 5, the lowering action of rod 82 illustrated in the transition from FIGS. 13-2 to 13-3 causes cam member 78 to move downwardly from the position shown in FIG. 5, this downwardly movement of cam member 78 causing its inclined cam surfaces 80 to slide downwardly along the inclined surfaces 76 on body engaging members 62 to pivot the members 62 radially outwardly about their respective pivots 70 into full contact with the interior wall of container sidewall 112.

As previously discussed above, the characteristics of a thermoplastic coated container sidewall 112 and the process by which the coated container body is manufactured are such that at the time the container body is fed into the spinwelding apparatus, the internal diameter of the body is normally somewhat smaller than its specified diameter. The thermoplastic container end 110, on the other hand, is quite accurately formed to its specified diameter and maintains this diameter quite accurately after its formation. In order that the spinwelding of the container sidewall to its end may be efficiently performed, it is essential that the container sidewall be at its specified internal diameter at the time the container bottom is inserted into the body so that the desired interference fit between these two parts, one of which is rotating relative to the other, will generate the desired amount of frictional heat to fuse the opposed thermoplastic surfaces or the thermoplastic end to the paperboard sidewall to each other.

As described above, the outer surfaces of the sidewall engaging members 62 of upper mandrel 28 are accurately machined to a diameter corresponding (with a slight negative tolerance) to the specified internal diameter of container body 112. The radial expansion of sidewall engaging members 62, by actuation of cam rod 82 after the members have been inserted into the container sidewall, is likewise accurately regulated so that at the conclusion of the cam actuated expansion of sidewall engaging members 62, the outer surfaces of these members are conformed to a cylindrical surface of a diameter equal to the specified internal diameter of the container sidewall (with a slight negative tolerance). Thus, in FIG. 13-3 at the conclusion of the expansion of sidewall engaging members 62 by lowering of cam actuator 82, the interior of the container sidewall has been accurately expanded, if necessary, to its specified diameter. The lower ends of sidewall engaging members 62 are spaced upwardly slightly from the end of the container sidewall to afford sufficient axial clearance for the insertion of portion 112 of the container end 110.

In FIG. 13-4, lower mandrel 30 has been elevated to position the container end 110 closely beneath, but out of contact with, the lower end of the container sidewall 112 supported upon the upper mandrel. In this step of the process, the lower mandrel 30 is engaged with a drive belt DB which drives the lower mandrel in rotation about its axis. The drive belt DB operates along a portion of the circular path followed by the lower mandrel, see U.S. Pat. No. Re. 29,448 for details of this driving arrangement. The container end 110 is rotatively locked to lower mandrel 28 by the webs 122 and thus rotates with the lower mandrel.

The elevation at which lower mandrel 30 is positioned relative to upper mandrel 28 in FIG. 13-4 is such that the solid teflon lined head 92 carried by seating retaining member 88 is at this time pressed firmly against the container end 110.

The next step in the sequence of operation finds upper mandrel 28 being lowered slightly to seat the container end 110 within the end of the container sidewall. Just prior to this lowering step, lower mandrel 30 passes out of engagement with drive belt DB, however, the rotary inertia of lower mandrel 30 maintains the lower mandrel in rotation as the end inserting step is performed. Because the container sidewall 112 carried by the upper mandrel 30 is held against rotation, the relative rotation between the engaged thermoplastic lined interior of container sidewall 112 and the rotating thermoplastic end 110 carried by the lower mandrel generates frictional heat melting the two engaged surfaces or melting the end to sidewall and at the same time exerts a braking action upon the rotating lower mandrel and container bottom. This braking action swiftly brings the freely rotating lower mandrel to a halt, the energy expanded in the braking operation being converted to the heat which melts and, upon halting, fuses the container bottom to the container sidewall.

In FIG. 13-6, the lower mandrel has been lowered to its original position, the now fused container sidewall and bottom are carried above an outfeed table OF and cam actuating rod 82 has been elevated to permit the sidewall engaging members 62 to be restored to their contracted position by garter spring 72.

In FIG. 13-7, upper mandrel 28 has been elevated to its original position to drop the container sidewall 112 onto the outfeed table, this separation of the container sidewall from the upper mandrel having been assisted by stripper plate 100 (FIG. 5).

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, other geometries which will lend themselves to spinwelding and which are strong, rigid with secure bonds are also within the scope of the present invention. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of making a container having a paperboard sidewall portion and a thermoplastic end portion spinweld bonded thereto, comprising the steps of:
    providing a thermoplastic container end comprising
        (a) a first portion for receiving one end of the container sidewall, said first portion comprising a first annular groove formed by a first wall member extending from the bottom of said groove and adapted to lie on the outer surface of the container sidewall and a second wall member relatively longer than said first wall member and extending from the bottom of said groove and being adapted to enter into the container and lie on the inner surface of the container sidewall; and
        (b) a second portion, connected to said second wall member at a position remote from said first wall member and near the end of said second wall member adapted to enter into the container, said second portion including means for transferring to a direction normal to a spinwelded bond, any shear forces which arise due to axial forces on the container end which tend to shear said spinwelded bond, said shear force transmitting means comprising (i) an end-wall portion connected to and extending from said second wall member in a serpentine manner to form therewith a second annular groove of generally opposite orientation from said first annular groove and (ii) a plurality of circumferentially spaced radial ribs, extending between said second wall portion and said serpentine end-wall portion, said plurality of ribs being operable to transfer forces acting on said container end from shearing said spinwelded bond;
    positioning said paperboard sidewall on a first mandrel having a vertical axis;
    positioning said container end on a second mandrel, coaxial with said first mandrel;
    rotating said second mandrel about said axis whereby said radial ribs on said end portion engage driving means on said second mandrel to rotate said end portion;
    positioning an end of said paperboard sidewall into said first annular groove of said container end, whereby said shear force transmitting means supports said second wall member against lateral deflection and whereby the rotary inertia of said second mandrel generates frictional heat which spinweld bonds said container to said sidewall.

2. A method according to claim 1, further including the step of coating the paperboard sidewall with a coating of thermoplastic, synthetic resin material prior to positioning said sidewall on said first mandrel.

3. A method according to claim 1, wherein said second wall member is bevelled radially inwardly along a portion thereof, and said end-wall portion is connected to said second wall member at a radially inward location of said bevelled portion, whereby the bevelled portion facilitates said step of positioning an end of said sidewall into said first annular groove.

* * * * *